United States Patent [19]

Pollack et al.

[11] 4,060,316
[45] Nov. 29, 1977

[54] IMAGING METHOD

[75] Inventors: Joel M. Pollack, Rochester; John B. Flannery, Webster, both of N.Y.

[73] Assignee: Xerox Corporation, Stamford, Conn.

[21] Appl. No.: 668,896

[22] Filed: Mar. 22, 1976

Related U.S. Application Data

[63] Continuation of Ser. No. 552,897, Feb. 25, 1975, abandoned.

[51] Int. Cl.$^2$ .................. G11B 21/14; G02B 5/18; G02F 1/13
[52] U.S. Cl. .................. 353/20; 350/160 LC; 350/162 SF; 353/120; 353/121; 353/122
[58] Field of Search .................. 350/160 LC, 162 SF; 353/121, 122, 120, 20

[56] References Cited

U.S. PATENT DOCUMENTS

| | | | |
|---|---|---|---|
| 3,744,879 | 7/1973 | Beard et al. | 350/160 LC |
| 3,813,145 | 5/1974 | Hedman et al. | 350/160 LC |

OTHER PUBLICATIONS

Carroll, Liquid Crystal Diffraction Grating, Journal of Applied Physics, vol. 43, No. 3, Mar. 1972, pp. 767–770.
Greubel et al., Electrically Controllable Domains in Nematic L—C's, Applied Physics Letters, vol. 19, No. 7, 10/1/71, pp. 213–215.

*Primary Examiner*—Steven L. Stephan
*Attorney, Agent, or Firm*—James J. Ralabate; Richard A. Tomlin; George J. Cannon

[57] ABSTRACT

An imaging method which is comprised of a spatially varying imagewise output intensity for a corresponding imaging input. An imaging member comprising between two electrodes a photoconductor in contact with an about 1 to about 6 micron thick layer of nematic liquid crystalline material, which in the absence of an electrical field is in the homogeneous texture, and having negative dielectric anisotropy is utilized. A d.c. voltage above the parallel variable grating mode threshold for the nematic liquid crystalline material is applied between the two electrodes of the imaging member and, while the voltage is applied, the photoconductor is exposed to imagewise configured actinic electromagnetic radiation from a first radiation source. The actinic radiation causes the voltage to increase across portions of the nematic liquid crystalline layer in electrical contact with regions of the photoconductor exposed to the actinic radiation. The increase in voltage across these portions of the liquid crystalline material is sufficient to cause cylindrical, vortical domains of molecules of the nematic liquid crystalline material to form with their long axes parallel to the initial direction of homogeneous alignment (a parallel variable grating mode). The spatial frequency of the vortical domains varies dynamically with the intensity of the actinic electromagnetic radiation. From a second radiation source, electromagnetic radiation which is non-actinic to the photoconductor by virtue of either the photoconductor or imaging member structure, is modified by the imagewise configured liquid crystalline texture resulting in a projection image of second source radiation corresponding to the imagewise configured first source electromagnetic radiation.

15 Claims, 6 Drawing Figures

IMAGING METHOD

This is a continuation, of application Ser. No. 552,897, filed Feb. 25, 1975, now abandoned.

BACKGROUND OF THE INVENTION

This invention relates to image amplification and, more particularly, to image amplification utilizing the imagewise formation of parallel variable diffraction grating domains in thin layers of nematic liquid crystalline materials having negative dielectric anisotropy.

Liquid crystal diffraction gratings are known. See, for example, Carroll, *Journal of Applied Physics,* 43, 3 (1972); Greubel and Wolff, *Applied Physics Letter,* 19, 213 (1971). Variable grating mode domains in nematic liquid crystalline materials as distinguished from the Williams domains were denoted as such by Penz and Ford, *Physical Review A,* 6, 414 (1972) and studied by Greubel and Wolff. The Greubel and Wolff studies showed that the domains in the variable grating mode were formed in a direction perpendicular to the initial homogeneous alignment of the nematic liquid crystalline material. This alignment is hereinafter referred to as the perpendicular variable grating mode.

U.S. Pat. Nos. 3,758,195 and 3,813,145 to Hedman et al are directed to information display apparatus utilizing as a diffraction grating, a cell containing a liquid crystalline material. It is believed that, at least in some instances, the diffraction results reported in these patents inherently resulted from a variable grating mode nematic liquid crystalline material having negative dielectric anisotropy but that the long axis of the domains in the variable grating mode were parallel to the initial homogeneous alignment (hereinafter referred to as parallel variable grating mode) rather than perpendicular as reported in the Greubel and Wolff article.

Electro-optical cells and displays having a photoconductor in contact with a layer of liquid crystalline material are known. See, for example, U.S. Pat. No. 3,707,322. While such cells are very suitable for particular imaging and display applications, including viewing the imaged liquid crystalline layer in transmission, such cells to our knowledge have not been used in projection image amplification.

In new and growing areas of technology such as liquid crystal imaging, new methods, apparatus, compositions, and articles of manufacture are often discovered for the application of the new technology in a new mode. The present invention relates to a novel method of imaging utilizing the formation of parallel variable grating mode domains in imagewise configuration and which exhibit an extremely high diffraction efficiency.

SUMMARY OF THE INVENTION

It is, therefore, an object of this invention to provide a novel method of imaging.

It is another object of this invention to provide image amplification having an extremely high diffraction efficiency.

It is another object of this invention to provide a low noise imaging device.

It is yet a further object of this invention to provide a liquid crystalline imaging device having continuous tone capability.

Another object of this invention is to provide a liquid crystalline imaging device capable of adjusting image contrast.

The foregoing objects and others are accomplished in accordance with this invention by providing between two electrodes, a photoconductor in electrical contact with an about 1 to about 6 micron thick layer of homogeneously aligned nematic liquid crystalline material having negative dielectric anisotropy; forming parallel variable diffraction mode domains in the liquid crystalline layer in imagewise configuration by exposing the photoconductor to actinic electromagnetic radiation in imagewise configuration; and reading out the imaged liquid crystalline layer by projecting therethrough electromagnetic radiation which is non-actinic to the photoconductor.

A BRIEF DESCRIPTION OF THE DRAWINGS

For a better understanding of the invention, as well as other objects and further features thereof, reference is made to the following detailed disclosure of preferred embodiments of the invention taken in conjunction with the accompanying drawings thereof, wherein.

DESCRIPTION OF THE PREFERRED EMBODIMENTS

Figure 2:
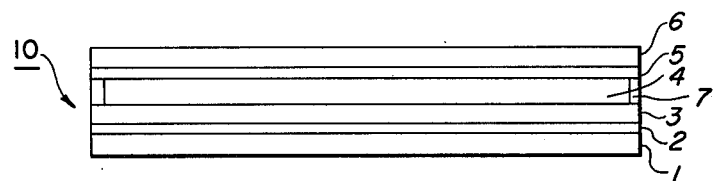
FIG. 2 is a cross-sectional schematic illustration of the imaging member utilized in the novel method of the present invention.

Referring now to FIG. 2, there is seen an imaging member comprising substrates 1 and 6, transmissive conductive coatings 2 and 5, photoconductor 3, layer 4 of nematic liquid crystalline material having negative dielectric anisotropy; and spacers 7.

Substrates 1 and 6 can comprise any suitable electrically insulating substrate. Typical suitable electrically insulating materials include glass, plastic, papers, ceramics, and other electrically insulating materials. Substrates 1 and 6 are transmissive or semi-transmissive to the actinic and non-actinic electromagnetic radiation described below in connection with the description of the projection image amplification method provided by the present invention. Conductive coatings 2 and 5 can comprise any suitable electrically conductive material. Typical suitable electrically conductive materials include gold, indium oxide, tin oxide, silver, and other conductors. Conductive coatings 2 and 5 are transmissive to the actinic and non-actinic electromagnetic radiation utilized in the method of the present invention.

Layer 3 of photoconductor material can comprise any suitable non-panchromatic or panchromatic photoconductor material. Typical suitable non-panchromatic photoconductive materials include dyes dispersed in binders such as, for example, Brilliant Green dispersed in polyvinylcarbazole and phthalocyanine dispersed in polyvinylcarbazole; doped alloys such as arsenic-selenium alloys doped with chloride; and undoped compounds such as unsensitized zinc oxide and cadmium sulfide. Generally speaking, photoconductor panchromaticity is defined by the band gap: a band gap (energy difference between conduction band and valence band) of 2.5 eV or greater indicating a non-panchromatic photoconductor. Reference is made to *Photoconductivity of Solids,* Bube, John Wiley & Sons, New York (1960) for a more complete listing of materials suitable for use in the practice of the present invention in accordance with the above criteria.

Typical suitable inorganic photoconductive materials include sensitized zinc oxide, for example, sensitized by the addition of rhodamine dye, available from Dupont; selenium, selenium alloyed with arsenic such as, for example, arsenic triselenide, tellurium, antimony or bismuth; cadmium sulfide, cadmium sulfoselenide, and the many other typical suitable inorganic photoconductive materials listed in U.S. Pat. No. 3,121,006 to Middleton et al. and listed in U.S. Pat. No. 3,288,603, both of which patents are hereby incorporated by reference. Typical suitable organic photoconductive materials include, for example, the combination of 2,5-bis(p-aminophenyl)-1,3,4-oxadiazole available under the trademark TO 1920 from Kalle and Company, Weisbaden-Biebrich, Germany and Vinylite VYNS, a copolymer of vinyl chloride and vinyl acetate, available from Carbide and Carbon Chemicals Company; and the combination of 2,4,7-trinitro-9-fluorenone to polyvinylcarbazole, available under the trademark Luvican 170 from Winter, Wolf and Company, New York, N.Y.

A non-panchromatic photoconductor is exclusively employed when by virtue of the imaging member configuration the second source radiation would otherwise be actinic to the imaging member.

A panchromatic photoconductor can be used when either an optical isolation element conductive only through its thickness is employed between the photoconductor and the liquid crystal, or the second source radiation is linearly polarized in a direction orthogonal to the polarization direction of a dichroic photoconductor.

Layer 4 of nematic liquid crystalline material having negative dielectric anisotropy can comprise any suitable dielectrically negative liquid crystalline nematic. These nematics align with the major axes of their molecules perpendicular to the electrical field created by a voltage applied between the two conductive coatings 2 and 5. Typical suitable nematics are disclosed in Vol. 18, *Ann. Physique,* page 273, G. Friedel (1922) hereby expressly incorporated by reference. Typical suitable dielectrically negative nematics include N-(p-methoxybenzylidene)-p-butylaniline (MBBA); p-azoxyanisole (PAA), N-(p-ethoxybenzylidene)-p-butylaniline (EBBA); dl-4-(2-methylhexyl)-4'-ethoxy-α-chloro-trans-stilbene; p-methoxybenzylidene-p'-aminophenyl-3-methylvalerate (MBV); p-ethoxybenzylidene-p'-aminophenyl-3-methylvalerate; pp'-methoxypentyltolane (MPT); pp'-propoxyheptyltolane (PHT); pp'-dioctoxytolane (DOT), trans-4-butyl-α-chloro-4'-ethoxystilbene and Phase IV and Phase V or nematic liquid crystalline phases available under the trademark Licristal from EM Laboratories, Inc. Phase IV is eutectic mixture of

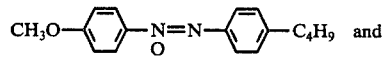 and

-continued

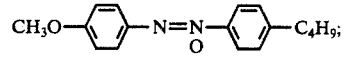

Phase V is a mixture of Phase IV and the eutectic mixture of

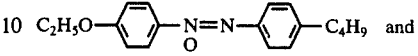 and

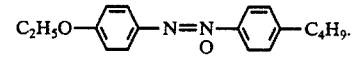

Spacers 7 are typically chemically inert. Materials suitable for use as insulating spacers 7 include cellulose acetate, cellulose triacetate, cellulose acetate butyrate, polyurethane elastomers, polyethylene, polypropylene, polyesters, polystyrene, polycarbonate, polyvinylfluoride, polytetrafluoroethylene, polyethylene terephthalate, and mixtures thereof. Spacers 7 can comprise vacuum evaporative materials which are vacuum evaporated outside the electroded area of the imaging member, or on the photoconductor in the case of transparent non-conductive spacer materials. Conductive vacuum evaporative materials include chrome, silver, gold, aluminum and combinations thereof, and other conductors. Non-conductive transparent vacuum evaporative materials include transparent silicon oxides, polystyrene latex microspheres, and glass microspheres, among others.

The vacuum evaporator spacers 7 are preferred because exceedingly high diffraction efficiencies result in the practice of the present invention when uniformity is provided in the thickness of layer 4 of nematic liquid crystalline material and in the homogeneous alignment of the nematic in the absence of an applied electrical field. Substantial uniformity in the thickness of layer 4 of nematic liquid crystalline material can be provided by utilizing uniformly sized non-conductive microspheres such as glass or latex microspheres. Any other technique suitable for producing uniform inter-electrode spacing can be employed.

It has been found that when the thickness of layer 4 of nematic liquid crystalline material is substantially uniform and is between about 1 micron to about 6 microns in thickness, and that when the zero field homogeneous alignment of the nematic liquid crystalline material in layer 4 is substantially uniform, then the variable grating mode obtained is one in which the domains form parallel to the zero field homogeneous alignment direction rather than perpendicular to that direction.

Figure 1:
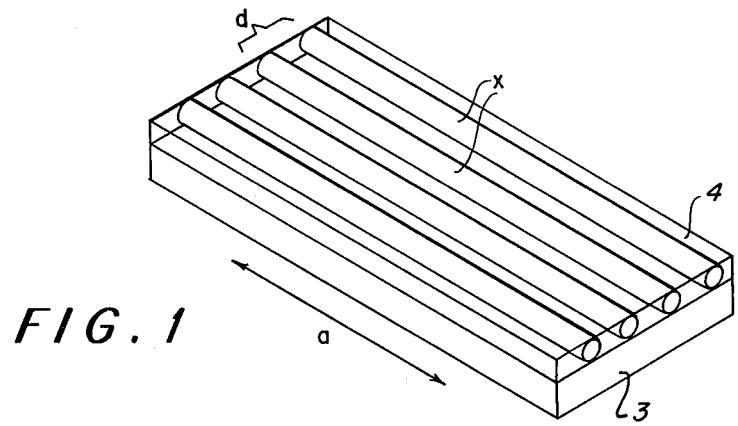
FIG. 1 is a partially schematic illustration of the parallel variable grating mode domains utilized in the practice of the present invention.

Referring now to FIG. 1, there is seen layer 3 of no-panchromatic photoconductive material upon which resides layer 4 of nematic liquid crystalline material having negative dielectric anisotropy. The direction "a" is the direction of zero field homogeneous alignment of the nematic liquid crystalline material and the rod-shaped domains "x" represent the vortical domains of the parallel variable grating mode. The long or major axes of "x" are parallel to the "a" direction. The vortical domains are believed to be formed due to the combined action of the electrical field and charge injection upon the nematic liquid crystalline material in layer 4. The electrical field is applied between conductive overcoatings 2 and 5 and therefore is applied perpendicular to the plane of layer 4 and perpendicular to the direction "a" of zero field homogeneous alignment. Since the nematic liquid crystalline material in layer 4 has negative dielectric anisotropy, the applied field acts initially to retain the homogeneous alignment direction. It is believed further that charges are injected into the nematic liquid crystalline material of layer 4. When the applied voltage exceeds a threshold, fixed for a given material at a constant viscosity, torques are created which, in turn, causes vortical movement of the nematic liquid crystalline material. These, in aggregate, result in the formation of scroll-like cylindrical domains. It has been observed that adjacent tubes thus formed in layer 4 rotate in opposite directions. The distance "d" between adjacent vortical tubes in the parallel variable grating mode and the size of the vortical tubes are, at threshold voltage, equal to the thickness of layer 4, and have been found to vary inversely with the magnitude of the applied voltage. That is, with increase in applied bias the size of adjacent vortical tubes and the distance therebetween decreases whereas with decreasing applied bias the size of the vortical tubes and the distance therebetween increases.

Since there exists an accompanying optical anisotropy to each nematic liquid crystal molecule, the ordered arrangement of the molecules into cylindrical domains periodically varies the optical path length in a direction orthogonal to the major axes of the domains and in the plane of the liquid crystal layer. Therefore, these tubes exhibit the properties of an optical volume grating. Therefore, the spatial frequency of the resulting grating increases with increasing electrical voltage and decreases with decreasing voltage. Grating spatial frequencies can be varied from about 125 to more than 2000 (vortical cylindrical domains per millimeter).

Any technique for providing homogeneous alignment of the nematic liquid crystalline material in layer 4 can be utilized and, with the exercise of care, substantially uniform homogeneous alignment can be achieved. Typical suitable homogeneous alignment techniques include the classical technique of rubbing the substrate as disclosed in P. Chatelain, *Bull. Soc. Franc. Min. Crist.*, 66, 105 (1943); providing a coating of aligning agent in contact with layer 4 of nematic liquid crystalline material such as, for example, one of the homogeneous aligning agents listed in Vol. 61, No. 7 *Proceedings of the IEEE*, p. 823, July, 1973 in the article "Surface-Produced Alignment of Liquid Crystals" by Kahn, Taylor and Schonhorn; and, the so-called Janning Technique described by J. L. Janning in *Appl. Phys. Letts.*, 21, 173 (1972).

Figure 4:
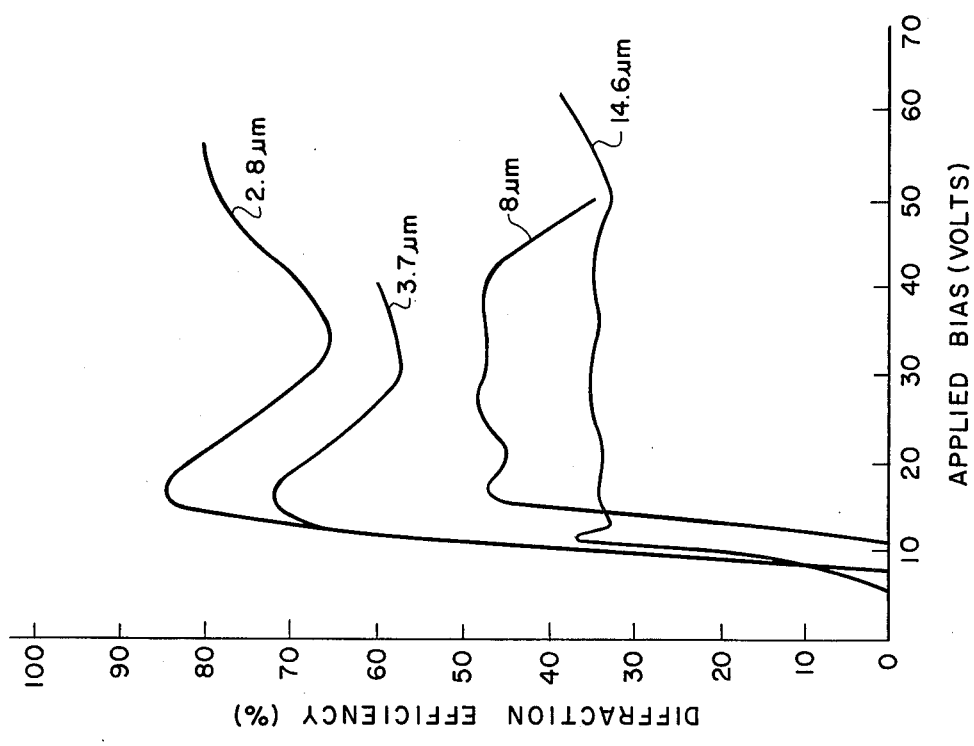
FIG. 4 is a graphical illustration of the variation and diffraction efficiency as a function of applied voltage for various layer thicknesses of a particularly preferred nematic liquid crystalline material.

FIG. 4 is a graphical illustration of the unique benefit of extremely high diffraction efficiency provided by the utilization of the parallel variable grating mode exclusive of the photoconductor. It has been found that the behavior of the parallel variable grating mode is substantially the same with a photoconductor. As can be seen from FIG. 4, the thinner cells are markedly higher in diffraction efficiency than the relatively thicker cells. Cells of about 4.7 micron thickness and about 7.4 micron thickness were also utilized and the diffraction results (not shown in FIG. 4) fall within the trend established by FIG. 4. "N5" of FIG. 4 is a mixture of terminally substituted aromatic azoxy compounds available from E. M. Laboratories, Inc., an affiliate of E. Merck Darmstadt, Germany. The material is a mixture of a material called N4 consisting of

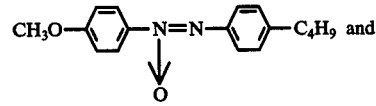

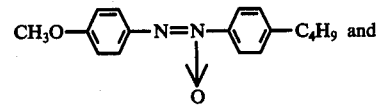

the eutectic mixture of 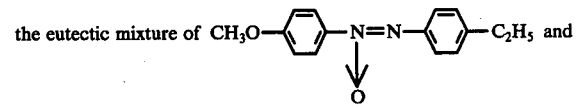

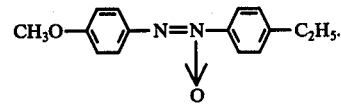

This material, used as received, is characterized by high resistivity ($\rho$ greater than or equal to $10^{10}$ ohm/cm) negative dielectric anisotropy ($-0.2$), and a dielectric constant of about 5.5.

The measurements for FIG. 4 were made on cells constructed in the conventional parallel plate capacitor configuration using very flat plate glass of about 0.25 inch thickness coated with a transparent conductive layer of indium oxide. Both electrodes are selectively etched to provide a circular active area of about 1 square centimeter. Prior to assembly, the electrodes were rigorously cleaned in a bath of dichromic acid, followed by ultrasonic cleaning and then rinsed in distilled and highly filtered water. Once dry the electrodes were orientation rubbed, without the use of surfactants, in accordance with the Chatelain technique to promote homogeneous zero field alignment of the N5 nematic liquid crystal. Six cells are constructed having interelectrode spacings (to be occupied by a layer 4 of the nematic) of 2.8, 3.7, 4.7, 7.4 8, and 14.6 microns. The latter three thicker cells utilized mylar strips as spacers; whereas, the three thinner cells were spaced with evaporated metallic layers of chrome overcoated with silver in the shape of a spot approximately 2 millimeters in diameter. The six cells were assembled and epoxied lightly at several points with a fast drying epoxy resin available from the Dexter Corporation under the name Epoxy Patch. Coplanarity of the confining electrodes was determined by observation of optical interference fringes visible through the use of a Van Keuren helium lamp illuminator. Measured variance was less than 0.5 optical fringe (0.15 microns). Measurements of cell thickness were made by capacitive techniques using a General Radio Impedance Bridge (model 1615A) after filling with the N5 nematic. Filling of cells was by capillary action. Electrical connections were made in the conventional manner attaching leads to the bus bars with epoxy resin and silver print paint. All subsequent measurements were made at ambient temperature, without any additional temperature control of the cells.

Microscopic observation were made using a Leitz Ortholux Polarizing Microscope. The diffraction efficiency of voltage induced phase gratings was measured as the relative decrease in the intensity of the zero order transmitted beam of an unpolarized Spectra Physics 133M 5mW Helium-Neon Laser used for normal illumination of the cells. A conventional polarizer mounted in a calibrated turntable was introduced in the elluminating beam at a position between the laser and the cell for measurement of efficiency and response in polarized light. Light intensities were monitored using a solar cell with appropriate neutral density filters to insure a linear response characteristic. Measurements of first and second order diffracted intensity required appropriate spatial filtering in the input plane of the detector. Spatial frequencies of stationary domains were determined from the Bragg relationship $\eta\lambda = d\sin\theta$, where $\eta$ is the order of diffraction, $\lambda$ the wavelength of incident radiation, $d$ the domain width, and $\theta$ the angle of diffraction, using measured angular deflections of the first order diffracted beam as voltage to the test cell was varied incrementally. In all cases it was observed that spatial frequency varied linearly with voltage whereas the rate of change of spatial frequency varied inversely with thickness.

EXAMPLES I-VI

Optical characterizations of the six cells were obtained as follows. Polarized microscopy confirmed that uniform homogeneous alignment as obtained in the zero field state, without the use of surfactants, over the entire electroded cell area. A threshold voltage of about 10 volts d.c. was noted for all cells but the one having the about 14.6 micron thick nematic layer. This latter cell exhibited a threshold voltage of about 5 volts d.c. The threshold voltage noted is the amount of voltage required to be applied prior to observation of any domains in the liquid crystal cell. The cells with nematic layers of about 2.8 and about 3.7 microns exhibited domains the major axes of which were parallel to the initial homogeneous rubbing direction. Immediately upon application of the threshold field, the perpendicular variable grating mode was momentarily observed and almost immediately switched to the parallel variable grating mode. In the cell with the about 4.7 micron thick nematic layer, upon application of the threshold voltage the cell briefly exhibited perpendicular variable grating mode but switched to the parallel variable grating mode and exhibited a preference for the parallel mode under steady state conditions. However, the about 4.7 micron thick cell, after a rest period of about 2 days, would initially exhibit the perpendicular variable grating mode under steady state conditions and then revert to the parallel variable grating mode with use.

The cells with about 7.4 microns, about 8 micron, and about 14.6 micron nematic layers exhibited a preference under steady state conditions of applied threshold voltage for the perpendicular variable grating mode. This is, the classical variable grating mode reported by Greubel and Wolff. The two thicker cells exhibited the classical perpendicular variable grating mode, however, the about 7.4 micron thick nematic layer would momentarily go into the parallel variable grating mode during extended use.

Accordingly, it is concluded that the about 4.7 micron thick cell and the about 7.4 micron thick cell bracket the thickness limit on parallel variable grating mode in that the thicker cell shows a steady state preference for the perpendicular variable grating mode and the thinner cell shows a steady state preference for the parallel variable grating mode.

Other observations in Examples I-VI include: the domain patterns in both parallel and perpendicular variable grating mode was stationary at a fixed voltage at or above threshold voltage, but with increasing voltage the width of the individual domains decreases. The perpendicular variable grating mode (thicker) cells exhibited dynamic scattering at voltages somewhat above threshold; whereas, for the variable grating mode (thin) cells, the width of the individual domains continued to diminish for voltages up to the level for electrical breakdown.

EXAMPLES VII-XII

The test cells are individually placed in their respective variable grating modes (parallel for the thin cells, perpendicular for the thick cells) and illuminated, in turn, with light linearly polarized in a direction perpendicular to the orientation of the domains and with light linearly polarized in a direction parallel to the domains. The efficiencies of the two othrogonal polarizations were compared with the efficiency of the non-polarized illumination and it is concluded that the unpolarized diffraction efficiency is an average of the combination of the efficiencies of the constitutent polarizations. Peaks in diffraction efficiency for each test cell for polarized light, polarized in the direction of the domains and for unpolarized light occurred in the range between about 15 and about 40 volts d.c.; whereas the diffraction efficiency for each test cell for polarized light polarized perpendicular to the domains continues to climb with increasing applied voltage. It is concluded that the test cells in the parallel variable grating mode are most efficient for light polarized parallel to the domains at lower applied voltages, while at higher applied voltages the test cells in the variable grating domains are most efficient for light polarized perpendicular to the domains. It is further observed that the domains orientated parallel to the direction of polarization of polarized light possess the highest contrast as observed through a polarizing microscope.

Figure 6:
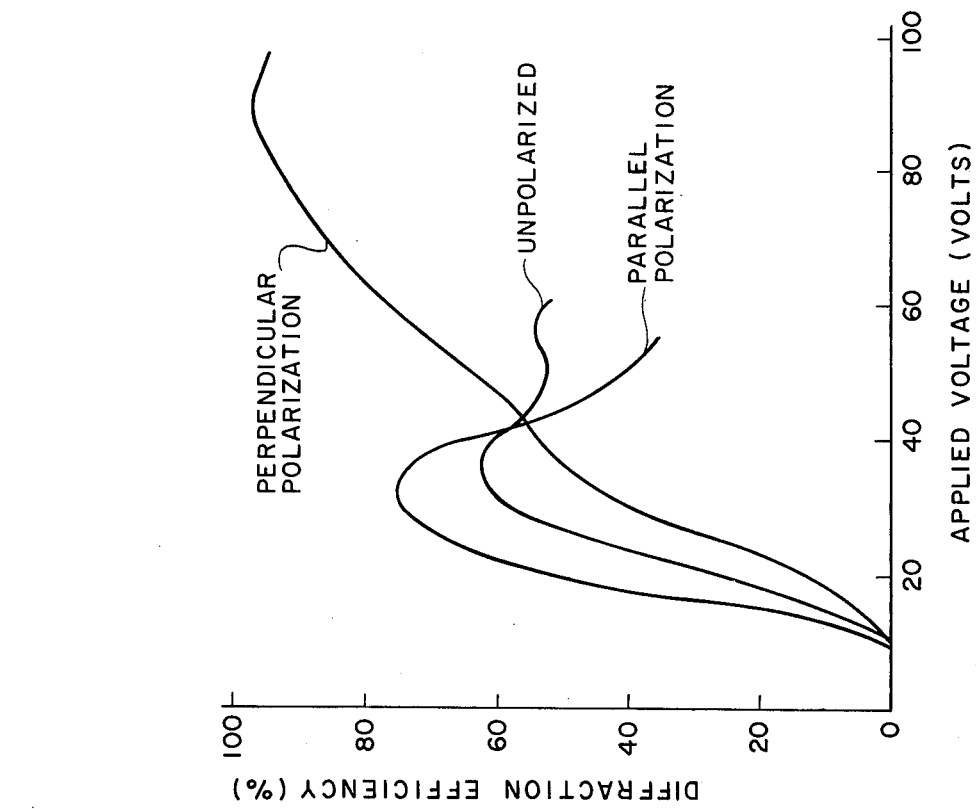
FIG. 6 is a graphical illustration of the typical diffraction efficiency pattern for light of varied polarization.

FIG. 6 is a graphical illustration of the typical diffraction efficiency pattern obtained when diffraction efficiency was plotted as a function of applied voltage for light polarized parallel to the major axes of the domains, for light polarized perpendicular to the major axes of the domains, and for unpolarized light. FIG. 6 graphically illustrates that unpolarized diffraction efficiency is an average of the combination of the efficiencies of the constituent polarizations (parallel and perpendicular to the major axes of the domains of the variable grating mode) and demonstrates that the parallel and perpendicular linearly polarized constituents of unpolarized light have separate ranges of applied voltage in which optimum or maximum diffraction efficiency occurs. Thus, if one desired to obtain diffraction efficiencies greater than the maximum diffraction efficiency for unpolarized light one could use light linearly polarized in a direction parallel to the domains over a first range of voltages above the threshold voltage for parallel variable grating mode, and one would use light linearly polarized in a direction perpendicular to the domains over a second range of voltages above the threshold voltage for parallel variable grtting mode. For example, while the plot of the data in FIG. 6 is representative of the behavioral trend of efficiency versus applied voltage for the test cells, the data utilized in FIG. 6 was obtained on the test cell having a nematic layer of about 3.7 micron in thickness. Therefore, for the cell having a nematic layer of about 3.7 micron in thickness and comprising Licristal Phase V, the threshold voltage for parallel variable grating mode is about 10 volts, between about 10 and about 40 volts applied voltage the highest diffraction efficiency will be obtained with light linearly polarized in a direction parallel to the major axes of the domains, and between about 40 and about 100 volts and higher the highest diffraction efficiencies are obtained with light linearly polarized in a direction perpendicualr to the major axes of the domains.

Figure 3:
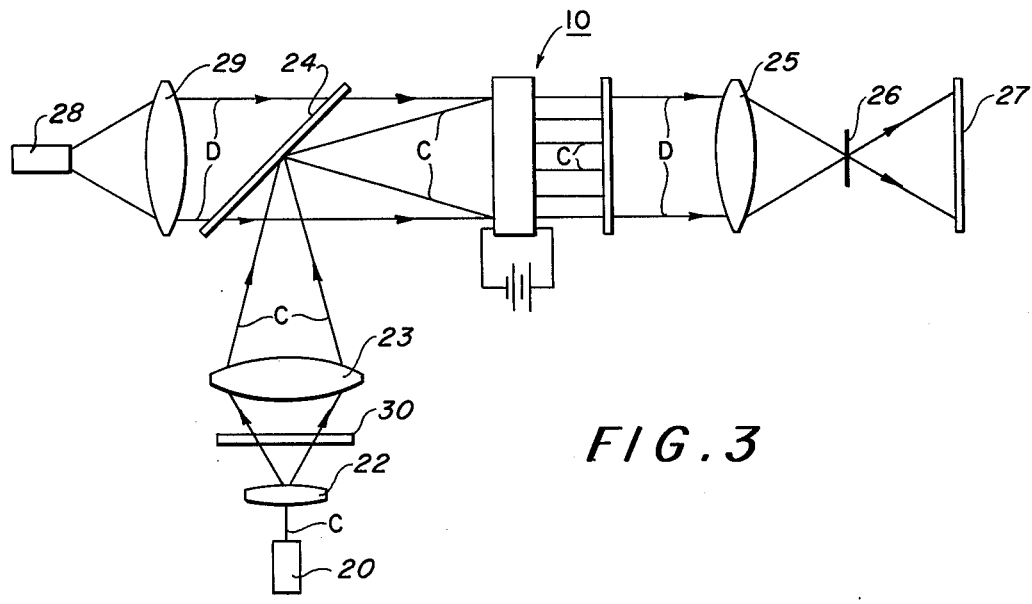
FIG. 3 is a schematic illustration of a first embodiment of the present invention.

FIG. 3 is an "on axis" embodiment of the practice of the present invention. Referring now to FIG. 3, there is seen a source 20 of exposing illumination C, a condenser lens 22, a transparent object 30, and imaging or field lens 23, dichroic mirror 24, parallel variable grating mode cell 10, filter 31, field lens 25, optical stop 26, and screen 27. Electromagnetic radiation C passes through condenser lens 22 which causes the radiation C to diverge and illuminate transparent image 30. Radiation C in passing through transparency 30 is blocked by opaque areas of transparency 30 and strikes imaging lens 23 in imagewise configuration. The imagewise configured radiation C is focused by lens 23 upon the non-panchromatic photoconductive layer 3 of cell 10 in reflection from dichroic mirror 24. The imagewise configured radiation focused upon the non-panchromatic photoconductive layer 3 causes the photoconductor to become conductive in imagewise configuration and causes charges to be injected into layer 4 in imagewise configuration. Domains in the parallel variable grating mode are now formed in imagewise configuration in nematic liquid crystalline material layer 4. This, of course, corresponds to the non-opaque areas in transparency 30. Filter 31 absorbs any radiation C passing through the cell 10 (not absorbed by photoconductive layer 3).

The parallel variable grating mode image in nematic liquid crystalline layer 4 is read out on screen 27. The reading radiation D is provided by radiation source 28, passes through collimator 29 and dichroic mirror 24, and is diffracted by the imagewise configured parallel variable grating mode of nematic liquid crystalline layer 4 of cell 10. The reading radiation passing through cell 10 comprises imagewise configured zero under radiation (non-diffracted radiation) and imagewise configured diffracted radiation. The zero order and diffracted reading radiation passes through filter 31 and field lens 25. Field lens 25 is positioned so that the plane of the nematic liquid crystalline layer 4 is focused upon screen 27. Optical stop 26 is positioned at the Fourier plane to stop either the zero order light only which would then result in a positive image appearing upon screen 27 or to stop the diffracted light only which would then result in a negative image appearing upon screen 27.

Radiation source 20 may comprise any source of radiation which is actinic to non-panchromatic photoconductive layer 3 in cell 10. Radiation source 28 can comprise any source of radiation which is non-actinic to non-panchromatic photoconductive layer 3 of cell 10. These sources of radiation can be monochromatic sources such as, for example, lasers; or alternatively, dichroic mirror 24 can be selected to transmit only one color of light thus allowing source 28 to be a source of white light or a broad spectrum source of radiation so long as the one color of light transmitted by the dichroic mirror is non-actinic to non-panchromatic photoconductor 3.

In a particularly preferred embodiment of the imaging and readout scheme depicted in FIG. 3, the non-panchromatic photoconductor layer 3 comprises Brilliant Green Crystals, available from General Dyestuff Co., or Victoria Green, available from Allied Chemical, dispersed in polyvinylcarbazole and is from about 2 to about 12 microns thick. The nematic liquid crystalline layer 4 comprises nematic Phase V from E. M. Laboratories, Inc. and is about 3 microns thick. A voltage of about 50 volts d.c. is applied across cell 10 and maintained. During application of this voltage level radiation from a helium-neon laser is provided in imagewise configuration by being passed through a slide transparency and activates the photoconductor in imagewise configuration. Green reading light is provided by passing white light through a dichroic mirror which allows only green light emerge in transmission but which reflects the red laser light. A green filter is placed between the cell 10 and the stop to eliminate red actinic light. A zero order stop is employed to provide a positive green image on the screen corresponding in imagewise configuration to the slide transparency.

EXAMPLE XIII

An imaging member 10 (FIG. 2) is prepared as follows. Two commercially available flat glass plates about 0.25 inches thick and coated with a transparent conductive layer of indium oxide are cleaned in the manner previously described. By conventional photoresist etching techniques, a circular active area about 1 $cm^2$ is provided on each of the glass substrates. After again cleaning the glass substrates, one of the substrates is provided with a photoconductive layer by dip coating techniques. The photoconductive coating mixture comprises about 1.6 grams of Brilliant Green Dye dispersed in a solution of about 320 grams polyvinylcarbazole dissolved in about 4000 grams methylene chloride and has a viscosity of about 150 centipoise. The plate to be coated is placed in the photoconductive dispersion and withdrawn at a rate of about 5 inches per second and allowed to air dry. The second plate is provided in a vacuum evaporator and is provided with four spacers outside of the active area. The spacers comprise a first vacuum evaporated layer of chrome having a thickness of about 50 angstroms and, on top of the chrome, a vacuum evaporated coating of silver sufficient to provide a total spacer height of about 3.7 microns. A layer of silicon monoxide is deposited upon the second plate in accordance with the previously referred to Janning Technique to provide a coating which will homogeneously align nematic liquid crystalline material. The two plates are then brought into space relationship, separated by the vacuum evaporated spacers and with the silicon monoxide coating in opposed relationship to the photoconductive layer which is deposited in such a fashion as to not cover the entire electrode in order to provide electrical contact for electrical connection with a suitable voltage source. Completion of cell construction was then accomplished in accordance with the previously described procedures.

The "on-axis" imaging and readout scheme depicted in FIG. 3 is set up utilizing a helium-neon laser as the source of imaging radiation and an unpolarized krypton laser as the source of the readout radiation.

A variable source of d.c. voltage is electrically connected to the cell. A transparent image is inserted in the path of the radiation from the helium-neon laser and a dichroic mirror, 94-720-600, available from Liberty Mirror Company, Brackenridge, Pa. is utilized. This dichroic mirror will reflect the radiation from the helium-neon laser and will transmit only the green light from the white light source. A blue colored filter which absorbs red light is inserted in the readout path between the cell and the lens 25. With about 50 volts d.c. applied from the variable voltage source, the laser and blue light sources are turned on and an image is observed on screen 27 corresponding to the image transparency.

The helium-neon laser is turned off and the screen 27 is uniformly illuminated with blue light and no image is discernible. The red laser is turned on again and the image reappears. The blue light source is turned off and the screen 27 appears uniformly dark with no discernible image appearing thereon.

A linear polarizer, commercially available from the Polaroid Corporation under the name Polaroid, is placed in the path of the readout radiation between blue light source 28 and dichroic mirror 24. The d.c. voltage applied across the cell is step-wise increased from about 10 to about 90 volts and at each level of applied voltage the linear polarizer is rotated to first linearly polarize the blue light in a direction parallel to the major axes of the liquid crystal domains and is then rotated to a second position to linearly polarize the blue light in a direction which is perpendicular to the major axes of the liquid crystal domains. The images produced on screen 27 for both directions of polarization at each of the levels of increasing voltage are compared. Image contrast at voltages between about 10 to about 40 volts d.c. is best with polarization in a parallel direction whereas image contrast is best between about 40 volts and about 90 volts d.c. wth polarization in a perpendicular direction. The placement of the linear polarizer at different points along the path of the readout light between the source 28 and the screen 27 is undertaken and the procedure repeated. The results are the same.

The image transparency is removed and replaced with an image transparency having information in a range of low spatial frequencies surrounded by a background in a range of high spatial frequencies. The applied voltage is adjusted to about 20 volts d.c. and a linear polarizer is placed in the first position where the polarization direction is parallel to the liquid crystalline domains. The image appearing on screen 27 includes only the low spatial frequency information and the background on the original image transparency having spatial frequency is not discernible on screen 27.

The image transparency is removed and replaced with an image transparency having an imagewise configuration information in a range of high spatial frequencies and background information in a range of low spatial frequencies. The linear polarizer is placed in the first position of parallel polarization and the voltage remains at about 20 volts d.c. Only the range of low frequencies background information is discernible on screen 27. The linear polarizer is rotated to the second position of perpendicular polarization and, while only the background information in a range of low spatial frequencies is observed on screen 27, the image contrast is diminished. The voltage is increased to about 80 volts d.c. and the linear polarizer remains in the second perpendicular polarization position. The image on screen 27 now contains both the high spatial frequency imagewise configured information and the low spatial frequency background information. The image on screen 27 contains the same information as before, however, the imagewise configured information of high spatial frequency has gained contrast over the background information of low spatial frequency. The linear polarizer is now rotated to the first position of parallel polarization and the voltage remains at about 80 volts d.c. The image on screen 27 contains the same information as before, however, the background information of low spatial frequency now exhibits greater contrast than the imagewise information of high spatial frequency.

Insofar as one is utilizing this as a Schlieren readout system, the brightness of the image is directly dependent upon the contrast ratio between diffracted and undiffracted light. Furthermore, it has been observed that the contrast ratio between diffracted and undiffracted light is maximized when utilizing light polarized parallel to the gratings in the range of 10 to 40 volts while it is maximized using light polarized perpendicular to the gratings above 40 volts. Thus, it is possible to maximize the brightness of the image projected onto screen 27 from a direction parallel to the gratings to a direction perpendicular to the gratings. It should be noted that this is the case when using the diffracted light only stopping the zero orders the coverage is true for the opposite polarity image.

Figure 5:
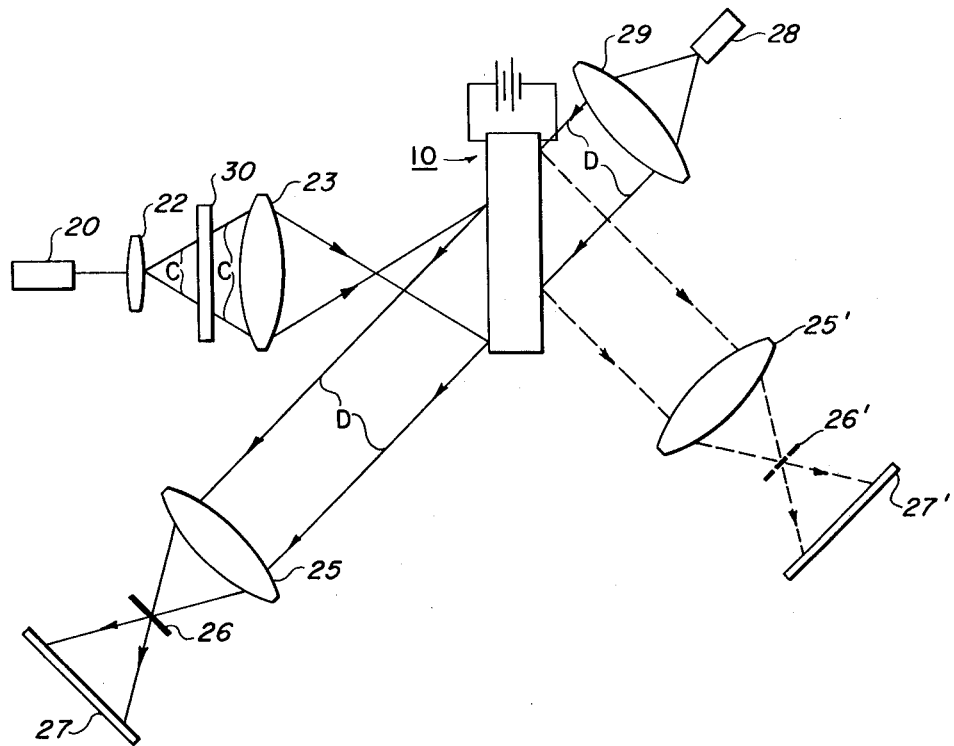
FIG. 5 is a cross-sectional schematic illustration of a second embodiment of the present invention.

Referring now to FIG. 5 which shows a second "off-axis" embodiment of the present invention, like numerals in FIG. 5 refer to like elements in FIG. 3. In the "off-axis" embodiment the read in and read out radiation does not impinge cell 10 on the same axis. As seen in FIG. 5, read in radiation C from source 20 impinges cell 10 in a direction orthogonal to the plane of cell 10 whereas read out radiation D impinges cell 10 in a direction which is angular with respect to the plane of cell 10.

FIG. 5 illustrates two off-axis modes: the first (D shown in solid lines) being the transmission mode and the second (D shown in dotted lines) being the reflection mode. The off-axis transmission mode is practiced with the same constraints as the on-axis transmission mode except that filter 31 can be dispensed with. In the reflection mode the photoconductor can be panchromatic and an optical buffer or insulating layer having the aforementioned electrical conductivity only through its thickness, is inserted to shield the panchromatic photoconductor from the read out light. Examples of typical suitable optical buffers having these characteristics are capillary pin-tube arrays, sputtered metallic coatings and high density grids such as aluminum-on-gold spots vacuum evaporated on the panchromatic photoconductor.

With the foregoing description it can be readily appreciated by those skilled in the art that positive-to-positive image amplification from these gratings is uniquely provided with a very high diffraction efficiency in accordance with the practice of the present invention. Further utilization of the present invention includes frequency conversion from coherent to incoherent light and from incoherent to coherent light, and low noise imaging.

In frequency conversion, and referring now to FIG. 3, input radiation source 20 can be coherent light such as the helium-neon laser and readout light from radiation source 28 can be incoherent light produced by utilizing a source of white light together with a green filter. Or, incoherent light to coherent light frequency conversion can also be achieved by utilizing for source 20 white light and a red filter and by utilizing for radiation source 28 a krypton laser. It is to be noted also that in the previous discussion of imaging utilizing the scheme of FIG. 3, readout radiation source 28 can be coherent light such as, for example, that produced from a krypton laser.

The method practiced in accordance with the present invention additionally uniquely provides a low noise imaging scheme due to the threshold nature of the parallel variable grating mode. That is, by carefully adjusting the voltage across the cell 10 in FIG. 3, any dust or foreign matter in background areas of image transparency or slide 30 can be omitted in the image focused upon screen 27. For example, suppose image transparency or slide 30 comprises a white image on a black background. Suppose further that the black background contained some dust or foreign matter of a light or whitish color. The background foreign matter can be excluded from the image focused upon screen 27 by adjusting the voltage across cell 20 a predetermined amount such that the regions corresponding to foreign matter are diminished to voltage levels below the threshold value for parallel variable grating mode. This predetermined amount of adjustment below threshold will be determined by the intensity of light striking the photoconductive layer 3 which corresponds to the white image areas on transparency 30. The adjustment is such that this intensity of light will modify the voltage division between photoconductive layer 3 and nematic liquid crystalline material layer 4 so that corresponding image areas of layer 4 remain at or above the threshold voltage for parallel variable grating mode. The intensity of light from the light or whitish foreign matter on the black background will not be as great as the intensity of the white image and, accordingly, the voltage division modification in layer 4 is typically not sufficient to cause corresponding background areas of layer 4 to go into the parallel variable grating mode. Similarly, there can be some dark matter on a white background. Another way of eliminating background noise from the image focused on screen 27 in FIG. 3 is to take advantage of the spatial frequency variation in the parallel grating mode that corresponds to the intensity variation of the imagewise configured input light striking the photoconductive layer 3. As was previously indicated, the parallel variable grating mode is dynamically responsive to the intensity distribution of the imagewise configured input striking the photoconductor 3. That is, when nematic layer 4 of cell 10 is FIG. 3 is at or above the threshold voltage value for parallel variable grating mode the entire layer 4 is in that mode but the size of the domains and the spatial frequency of the domains varies with the voltage division between photoconductive layer 3 and nematic layer 4 which itself is dependent upon the intensity distribution in the imaging radiation. The greater the intensity of imaging radiation striking photoconductor 3 the greater the relative portion of voltage applied across cell 10 appears across nematic layer 4. The greater the voltage appearing across layer 4, at or above threshold, the smaller the size of the domains and the greater the spatial frequency of the domains. The greater the spatial frequency of the domains in the parallel variable grating mode, the greater the angle of diffraction or radiation passing through that region of nematic layer 4. In short, radiation passing through portions of nematic layer 4 having a large spatial frequency will be diffracted at a greater angle away from zero order radiation than radiation passing through portions of nematic layer 4 having a relatively low spatial frequency. An annular stop placed in the fourier plane will allow only radiation passing through the annulus to focus on screen 27. The radial location of the annulus in the annular stop can be selected to allow radiation corresponding to only a particular range of diffraction angles to pass therethrough; that is to say, spatial filtering is thereby achieved. In this way, the light diffracted from foreign matter on the background portions of the image transparency can be prevented from being included in the image focused on screen 27.

While the particularly preferred embodiment has been described with respect to transmission projection, it will be appreciated by those skilled in the art that reflection projection can also be utilized providing that the output radiation in reflection does not activate (or, is non-actinic to) the photoconductor 3. Further, it will be appreciated by those skilled in the art that panchromatic photoconductors can also be employed to prevent the readout radiation from activating the panchromatic photoconductor. Any of several methods can be employed to enable utilization of a panchromatic photoconductive layer 3 and readout light wherein the readout light does not activate the panchromatic photoconductor. Included among these are: the use of a dichroic photoconductor such as those disclosed in U.S. Pat. No. 3,598,582 herein expressly incorporated by reference, such photoconductors being activated only by linearly polarized light of appropriate polarization orientation thereby allowing one orientation of linearly polarized light to be used as the image input and another orientation of linearly polarized light to be used for image readout. Such methods will allow virtually all forms of optical transformation such as wavelength conversion coherency conversion, polarization conversion, amplification and others.

As indicated earlier, the layer thickness for nematic layer 4 having negative dielectric anisotropy can be from about 1 to about 6 microns thick. Above about 6 microns in thickness, the variable grating mode domains show a tendency to prefer the perpendicular variable grating mode under steady state conditions. The thickness of the photoconductor which can be employed with nematic layer 4 is determined by the dielectric constant of the photoconductor employed. A procedure for estimating the thickness preferred for any given photoconductive material employed, follows: assume that the total voltage applied across the cell, V, is divided between the photoconductor and the liquid crystalline layer in a capacitive manner and that under illumination the voltage drop across the photoconductor can be reduced to less than about 1/10 the initial value ($V_{pc0}$) of voltage across the photoconductor in the dark. Then initially, if the voltage across the liquid crystal layer in the dark is to be at about the threshold value is equal to $1/K^{-1}+1 - V$, where $K$ equals $E_pL_1$ divided by $E_1L_p$ where $L_p$ is the thickness of the photoconductor, $L_1$ is the thickness of the liquid crystal layer, $E_p$ is the dielectric constant of the photoconductor, $E_1$ is the dielectric constant of the liquid crystal and V is the total voltage applied across the cell. If we let $V_{10}$ represent the threshold value for parallel variable grating mode which is desired across the liquid crystal layer in the dark, then $V_{10} + V_{p0} = V$. Substituting the above expression for $V_{10}$ into the latter equation one can calculate the photoconductor thickness, $L_p$, required to match the thickness of the nematic layer 4 of a given dielectric constant and to divide the voltage in the amount desired both in the dark and upon exposure so that the threshold voltage level for parallel variable grating mode is reached only upon illumination of the photoconductor. If the photoconductor traps charge during use, then an increase in voltage applied across cell 10 will overcome the diminished voltage division across nematic layer 4.

It will be appreciated that other variations and modifications will occur to those skilled in the art upon a reading of the present disclosure. These are intended to be within the scope of this invention.

For example, with sustained actinic radiation upon the photoreceptor it has been observed that carriers become trapped. Over a period of time the total current density decreases. Accompanying the decrease in current is a decrease in the voltage applied across the liquid crystal layer. In short, exposed regions decrease in sensitivity to the actinic radiation at an exponential rate.

Thus by providing actinic radiation to uniformly illuminate the photoconductor those regions in the photoconductor previously unactivated now become activated, and conversely for regions previously activated.

Carefully adjusting the applied voltage, domains form in those regions of the nematic layer exclusive of where the image is formed when the photoconductor was previously imagewise exposed. Reading out this image with non-actinic radiation as before one now observed the same image, but reversed in image polarity with respect to the previous image.

This then provides a method for reversing the sense of the image independently of the procedure of changing the stops. It further provides a method for image storage.

With the liberation of the trapped charge the stored image disappears.

What is claimed is:

1. A method of imaging, comprising:
   a. providing an imaging member comprising, between two electrodes, a photoconductor in contact with a layer of homogeneously aligned nematic liquid crystalline material; said layer of nematic material having a thickness of from about 1 to about 6 microns and having negative dielectric anisotropy;
   b. applying a D.C. voltage between said two electrodes above the parallel variable grating mode threshold voltage level for said nematic liquid crystalline material; and
   c. during application of said D.C. voltage, imagewise exposing said photoconductor to actinic electromagnetic radiation from a first radiation source to form vortical domains of said liquid crystalline material in the parallel variable grating mode, wherein vortical domains of said liquid crystalline material are formed in a direction parallel to the direction of initial homogeneous alignment, and passing linearly polarized electromagnetic radiation from a second radiation source through regions of said nematic liquid crystalline material in the parallel variable grating mode, said linearly polarized electromagnetic radiation having a polarization direction substantially orthogonal to the major axes of said vortical domains.

2. The method according to claim 1 wherein said first radiation source comprises a source of coherent electromagnetic radiation.

3. The method of imaging according to claim 1 wherein said first radiation source comprises a source of incoherent electromagnetic radiation.

4. The method according to claim 1 wherein said second radiation source comprises a source of coherent electromagnetic radiation.

5. The method according to claim 1 wherein said second radiation source comprises a source of incoherent electromagnetic radiation.

6. The method according to claim 1 wherein said photoconductor is a non-panchromatic photoconductor.

7. The method according to claim 6 wherein the electromagnetic radiation from said second radiation source is non-actinic to said non-panchromatic photoconductor and is transmitted through said photoconductor prior to passing through said layer of nematic liquid crystalline material.

8. The method according to claim 1 wherein said photoconductor comprises dichroic photoconductive material, said actinic electromagnetic radiation from said first radiation source being linearly polarized in a polarization direction actinic to said dichroic photoconductor, and wherein said electromagnetic radiation from said second radiation source is linearly polarized in a polarization direction which is non-actinic to said dichroic photoconductor.

9. The method according to claim 1 further including the step of inserting an optical stop in the path of electromagnetic radiation from said second radiation source subsequent to its transmission through regions of said nematic liquid crystalline material in the parallel variable grating mode.

10. The method according to claim 9 wherein said optical stop is adapted to stop zero-order radiation and to allow diffracted radiation to pass.

11. The method according to claim 9 wherein said optical stop is adapted to stop diffracted radiation and to allow zero-order radiation to pass.

12. The method according to claim 9 wherein said optical stop is an annular optical stop adapted to allow only a portion of the diffracted radiation to pass and to stop zero-order radiation and the remaining diffracted radiation.

13. The method according to claim 9 further including the step of focusing upon a screen the electromagnetic radiation passing said optical stop and from said second radiation source.

14. The method according to claim 1 further including the step of uniformly exposing the photoconductor to actinic radiation subsequent to imagewise exposure in step (c).

15. A method of imaging, comprising
   a. providing an imaging member comprising, between two electrodes, a photoconductor in contact with a layer of homogeneously aligned nematic liquid crystalline material; said layer of nematic material having a thickness of from about 1 to about 6 microns and having negative dielectric anisotropy;
   b. applying a D.C. voltage between said two electrodes above the parallel variable grating mode threshold voltage level for said nematic liquid crystalline material; and
   c. during application of said D.C. voltage, imagewise exposing said photoconductor to actinic electromagnetic radiation from a first radiation source to form vortical domains of said liquid crystalline material in the parallel variable grating mode wherein vortical domains of said liquid crystalline material are formed in a direction parallel to the direction of initial homogeneous alignment, and passing linearly polarized electromagnetic radiation from a second radiation source through regions of said nematic liquid crystalline material in the parallel variable grating mode, said linearly polarized light having a polarization direction substantially parallel to the major axes of said vortical domains.

* * * * *